United States Patent
Delisle et al.

(10) Patent No.: US 6,381,052 B1
(45) Date of Patent: Apr. 30, 2002

(54) MULTIPLEXORS WITH A FLAT TOP SPECTRAL CHANNEL SHAPE

(75) Inventors: Vincent Delisle; Thomas Ducellier, both of Ottawa (CA)

(73) Assignee: JDS Fitel Inc., Nepean (CA)

( * ) Notice: Subject to any disclaimer, the term of this patent is extended or adjusted under 35 U.S.C. 154(b) by 0 days.

(21) Appl. No.: 09/271,879

(22) Filed: Mar. 18, 1999

(30) Foreign Application Priority Data

Mar. 18, 1998  (CA) ............................................. 2232666

(51) Int. Cl.[7] ................................................ H04J 14/02

(52) U.S. Cl. ....................... 359/130; 359/124; 359/127; 359/129; 359/153; 359/161; 359/615; 359/634; 385/24; 385/37

(58) Field of Search ................................. 359/124, 127, 359/129, 130, 153, 161, 615, 634; 385/24, 37

(56) References Cited

U.S. PATENT DOCUMENTS

| | | | | |
|---|---|---|---|---|
| 4,748,614 A | * | 5/1988 | Dammann et al. |
| 5,917,625 A | * | 6/1999 | Ogusu et al. |
| 5,982,960 A | * | 11/1999 | Akiba et al. |

* cited by examiner

*Primary Examiner*—Jason Chan
*Assistant Examiner*—Dzung Tran
(74) *Attorney, Agent, or Firm*—Neil Teitelbaum

(57) ABSTRACT

A multiplexing/demultiplexing optical circuit provides a demultiplexed output spectrum of channels having a flat amplitude response without sacrificing optical power. A phased array implementation and a diffraction grating implementation both rely on a first dispersion of the beam to be demultiplexed and subsequent division of the wavelengths into channels. Local inversion is induced within each channel of the dispersed wavelengths about a channel central wavelength. After the wavelengths are spatially inverted, they are once again provided to a dispersion element or array effectively nullifying the dispersion effects across the channel band to provide output channels having a substantially "flat-tops", while providing good channel separation through global dispersion of all the wavelengths.

14 Claims, 5 Drawing Sheets

MULTIPLEXORS WITH A FLAT TOP SPECTRAL CHANNEL SHAPE

FIELD OF THE INVENTION

The present invention relates to a method and apparatus for achieving multiplexing/demultiplexing of wavelengths, while concentrating wavelengths within a channel into a discrete location, particularly by cascading two like dispersion steps, with a local inversion of wavelengths about a channel center wavelength between them.

BACKGROUND OF THE INVENTION

In wavelength division multiplexed optical communication systems, many different optical wavelength carriers provide independent communication channels in a single optical fiber. Future computation and communication systems place ever-increasing demands upon communication link bandwidth. It is generally known that optical fibers offer much higher bandwidth than conventional coaxial communications; furthermore a single optical channel in a fiber waveguide uses a microscopically small fraction of the available bandwidth of the fiber (typically a few GHz out of several tens of THz). By transmitting several channels at different optical wavelengths into an fiber (i.e., wavelength division multiplexing, or WDM), this bandwidth may be more efficiently utilized.

There have been many attempts to develop a compact, high-resolution waveguide demultiplexor or spectrometer for application in areas such as spectroscopy, optical networks and optical links and more particularly optical communication systems. Such a demultiplexor can be extremely critical in wavelength division multiplexing (WDM) links. In these links or networks, each channel is assigned a distinct and unique wavelength for data transmission. Thus, the optical fiber that connects channels in a WDM network carries many discrete wavelength channels and a particular wavelength is selected before the data is received. The data reception can be achieved by combining a wavelength demultiplexor, photodetectors and electronic selection circuitries. In WDM links, many wavelengths are multiplexed and transmitted through a single optical fiber to increase the capacity of the fiber. The receiver must demultiplex the many wavelengths and select the proper channel for reception. In these applications, the requirements on the wavelength demultiplexor are typically: an optical bandwidth>30 nm, a wavelength resolution of a few angstroms, polarization insensitivity, compactness, low loss, low crosstalk, and a low manufacturing cost.

At present, there are many known methods of selecting particular wavelengths, however, none are ideal for the applications outlined above.

Techniques for multiplexing and demultiplexing between a single optical fiber comprising the multiplexed channel and plural optical fibers comprising the plural demultiplexed channels are described in various U.S. patents. For example, multiplexing/demultiplexing with birefringent elements is disclosed in U.S. Pat. Nos. 4,744,075 and 4,745,991. Multiplexing/demultiplexing using optical bandpass filters (such as a resonant cavity) is disclosed in U.S. Pat. Nos. 4,707,064 and 5,111,519. Multiplexing/demultiplexing with interference filters is disclosed in U.S. Pat. Nos. 4,474,424 and 4,630,255 and 4,735,478. Multiplexing/demultiplexing using a prism is disclosed in U.S. Pat. No. 4,335,933. U.S. Pat. No. 4,740,951 teaches a complex sequence of cascaded gratings to demultiplex plural optical signals. U.S. Pat. Nos. 4,756,587 and 4,989,937 and 4,690,489 disclose optical coupling between adjacent waveguides to achieve a demultiplexing function. A similar technique is disclosed in U.S. Pat. No. 4,900,118. Although some of these techniques are better than others, there is a need for a system that provides demultiplexed channels having spectral amplitudes that are as flat as possible.

Methods have been employed wherein an optical element having a periodically varying spectral response is used to flatten the spectral amplitudes within each of a group of multiplexed channels having different predetermined central wavelengths with uneven spectral amplitudes peaked around the central wavelengths. However such techniques and attempts a flattening reduce the overall power by "chopping" the signal to obtain flatter spectral amplitudes or "flat tops".

Dispersion elements commonly used in the prior art for demultiplexing channel separation cause continuous dispersion of individual wavelengths. However, each channel band for demultiplexing includes a plurality wavelengths dispersed continuously with the wavelengths of the other channel bands. As a result, the position of all wavelengths within a channel band to be picked up are not the same, and full amplitude pick up of all wavelengths by a waveguide or optical fiber is not possible. Further, the continuous dispersion causes difficulty of separation of individual channels causing crosstalk.

It is desired to provide demultiplexing by dispersing a complete channel band to a single position for the pick up of a signal without excess loss. It is also desired to separate individual channel bands from each other to reduce cross talk.

SUMMARY OF THE INVENTION

In accordance with the invention, there is provided a method of demultiplexing an optical beam into a plurality of channels, comprising a plurality of wavelengths of light, comprising the steps of:

provide the optical beam to a first dispersive means, to demultiplex the beam into spatially dispersed wavelengths of light;

dividing the spatially dispersed wavelengths of light into channels;

performing a inversion of the spatially dispersed wavelengths of light, centered about a center wavelength within each channel, to spatially invert their positions; and providing the inverted wavelengths of light to one of the first dispersive means and another dispersive means providing substantially the same dispersion as the first dispersive means for the plurality of channels, to provide the demultiplexed channels.

In accordance with a further embodiment of the invention an optical device is provided for demultiplexing an optical beam into a plurality of channels, comprising a plurality of wavelengths of light, comprising:

a first dispersive grating for receiving the beam to demultiplex the beam into spatially dispersed wavelengths of light;

means for dividing the spatially dispersed wavelengths of light into channels and for inverting the spatially dispersed wavelengths of light centered about a center wavelength within each channel; and dispersive means for receiving the inverted wavelengths of light to provide the demultiplexed channels.

In a still further preferred embodiment of the invention an optical device is provided for demultiplexing an optical beam into a plurality of channels, comprising a plurality of wavelengths of light, comprising:
  a first phased array grating for receiving the beam to demultiplex the beam into spatially dispersed wavelengths of light on a first output focal plane;
  means for dividing the spatially dispersed wavelengths on the first output focal plane into channels and for inverting spatially dispersed wavelengths centered about a center wavelength within each channel;
  a second phased array grating having an input focal plane for receiving the inverted wavelengths of light, for demultiplexing the channels.

Advantageously, demultiplexing in accordance with the present invention provides dispersion of a multiplexed signal to discrete channel locations reducing pick up loss and crosstalk.

Additional advantages will be apparent to persons of skill in the art from the detailed description of preferred embodiments together with the following drawings which illustrate preferred embodiments by example only:

BRIEF DESCRIPTION OF FIGURES

Like numerals are used throughout to designate like elements.

DETAILED DESCRIPTION OF PREFERRED EMBODIMENTS

Figure 1:
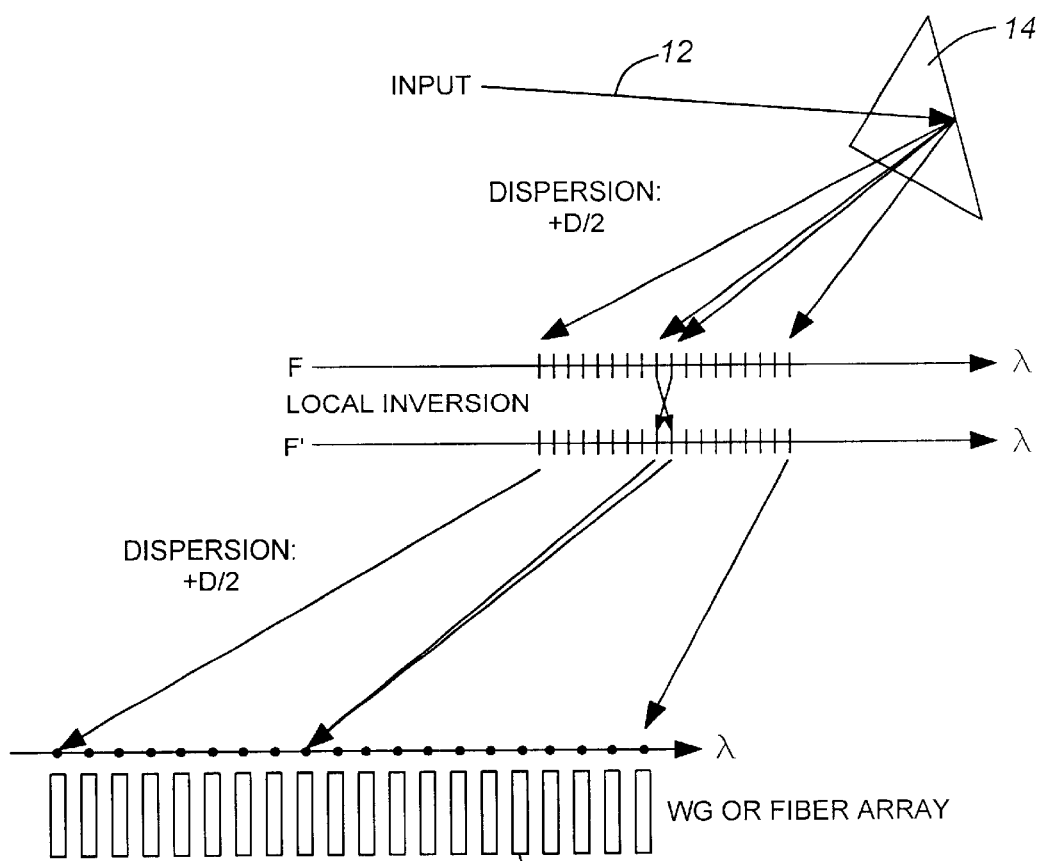
FIG. 1 is a schematic illustration of an optical demultiplexing/multiplexing system in accordance with the invention.

This invention provides a method and device for broadening the channel spectrum of a wavelength multiplexor/demultiplexor by means of having two dispersive elements and an array of image inverters between them. The method is shown generally in the system in FIG. 1 illustrating a beam of light 12 input to a first dispersion element 14 causing a separation in position of the light by wavelength shown at a first focal plane F. The spectrum is divided according to channel spacing, such as the standardized ITU channel bands in 100 gHz . Within each channel band a local inversion is induced about the channel center wavelength. The reordered spectrum is shown at transmission focal plane F'. The input and output sub-beams are placed at the focal planes of the lens or mirror causing the inversion. This inverts the deviation about the channel center wavelength providing balanced dispersion upon repeating the dispersion through a substantially like dispersion element (not shown). If the input wavelength is $_{ITU}+_{dev}$, then it will be dispersed as $_{ITU}$ since the deviation from the ITU center $_{dev}$ will experience balanced dispersion, due to the inversion (+D/2−D/2=0). This is illustrated as distinct channel separation in spatial position following the second dispersion for pick up by separate waveguides or an optical fiber array 18. Thus in a demultiplexing mode, wavelengths within each channel band are effectively concentrated spatially into a single point making it possible to pick up the demultiplexed signals with virtually 0 dB of extra losses.

It should be noted that in these schematic illustrations the lens necessary before each dispersive element has been omitted for clarity of the drawings.

Figure 2:
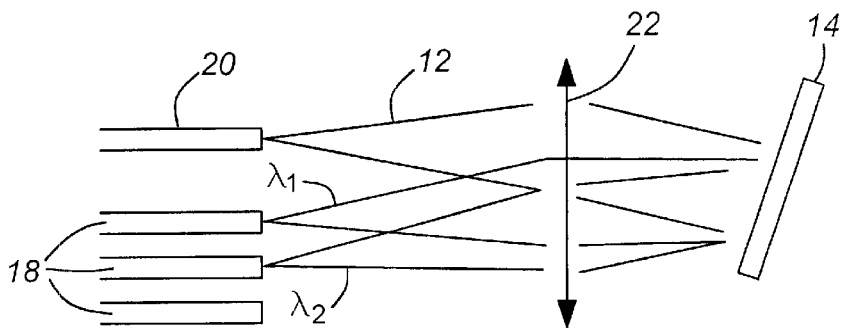
FIG. 2 is a schematic illustration of a prior art optical demultiplexing/multiplexing system based on a dispersion grating element.

FIG. 2 illustrates a prior art optical demultiplexing/multiplexing system based on a dispersion grating element. A beam 12 in input from input fiber 20. The beam 12 passes through a lens 22 and continues to the grating 14. Return beams dispersed by wavelength are picked up by output fibers 18. It is well known that diffraction gratings are dispersive components and the main drawback of this design is that the dispersion is continuous.

Therefore, there is only a limited wavelength range that is coupled into the output fiber array.

Figure 3:
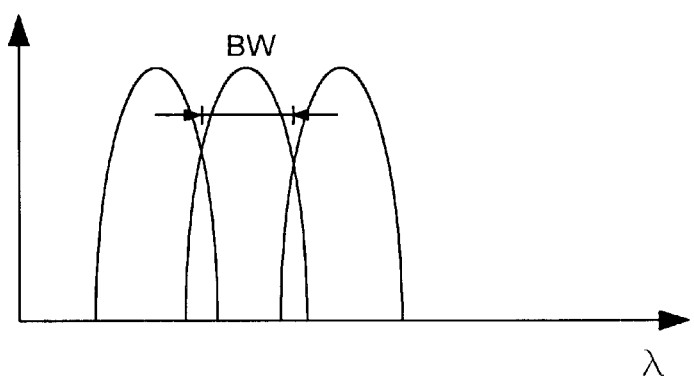
FIG. 3 graphically illustrates a spectral response common in the prior art showing a Gaussian channel shape and significant crosstalk.

In order to increase the bandwidth and improve the wavelength accuracy tolerances in an optical network, a "flat-top" channel shape is desired. A typical spectral response as would be expected from the system shown in FIG. 2, is shown in FIG. 3 which illustrates a Gaussian shape rather than a "flat top". The bandwidth, shown at BW between the arrows is quite narrow at full amplitude. A further problem shown in FIG. 3 is the channel overlap causing crosstalk. The channel shape shows that full amplitude signal from all wavelengths within the channel band are not picked up. The dispersed wavelengths are spatially positioned apart and physically cannot all be picked up in a fiber or waveguide. The overlap which shows no channel separation results in crosstalk signals from other channels being picked up.

Figure 4:
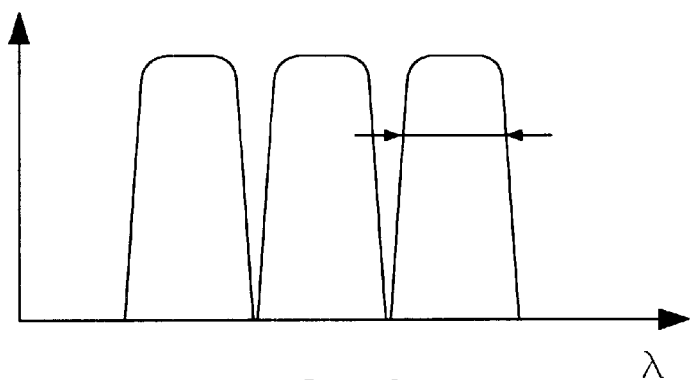
FIG. 4 graphically illustrates a preferred spectral response showing a substantially flat top and good channel separation.
Figure 5A:
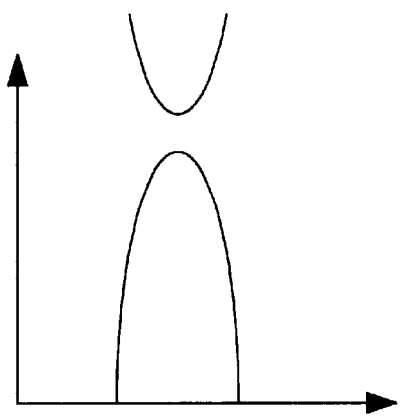
FIG. 5a illustrates a typical Gaussian spectral response and a filter profile used in the prior art for modifying a channel shape.
Figure 5B:
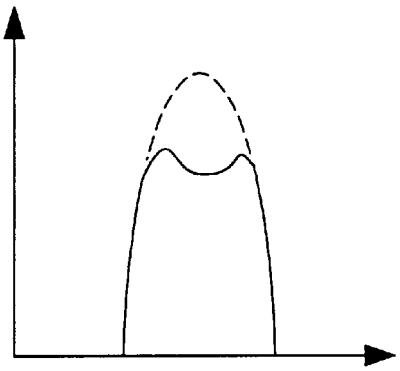
FIG. 5b illustrates the filter profile of FIG. 5a used to chop a portion of the signal to create a flat top response.

Previous solutions to achieve a preferred channel shape as shown in FIG. 4, wherein a chopping filter is utilized as shown in FIGS. 5a and 5b, have a significant power loss associated therewith.

In an embodiment of this invention, an output response such as that shown in FIG. 4 showing substantially flat top and good channel separation can be realized without any significant power loss utilizing a diffraction grating element. Here, all wavelengths comprising a single channel have the same output angle and therefore can be directed to a unique "pick-up" fiber with no extra losses.

Figure 6:
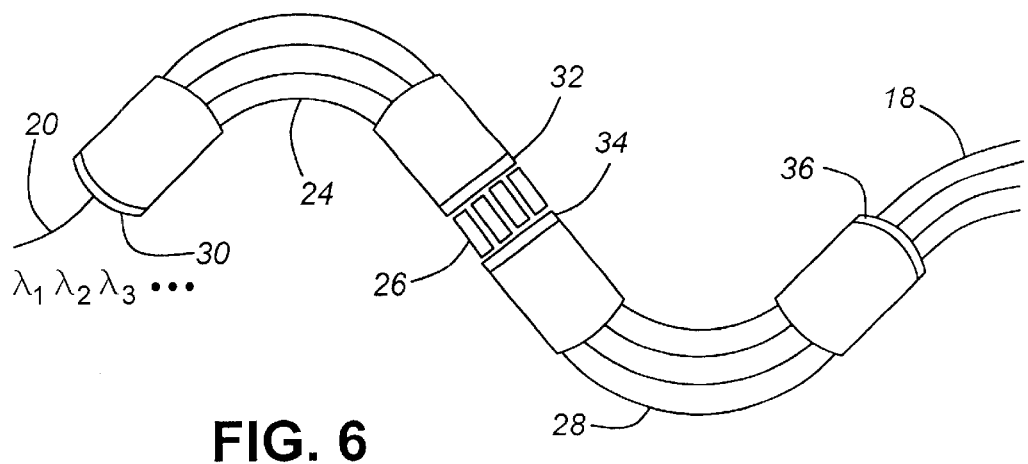
FIG. 6 is a schematic illustration of a preferred optical demultiplexing/multiplexing system in accordance with the invention comprising cascaded phased array gratings with an inversion array between them.

A preferred exemplary embodiment is shown in FIG. 6, where in a demultiplexing mode, multiple wavelengths are launched through input fiber 20 into one end at input focal plane 30. After propagating through a first phase arrayed waveguide grating 24 the light becomes spatially disbursed on output focal plane 32. An inversion means 26 divides the dispersed light on the output focal plane 32 into channels according to the desired channel spacing, and locally inverts the wavelengths within each channel. The local inversion should occur about the center wavelength of each channel. The divided wavelengths are inverted onto input focal plane 34, by way of an inversion means 26 such as an array of micro-refractive optical systems, which may include conventional lenses or Selfoc lenses, GRIN lenses, or MMI waveguides or V-Grooves. MMI waveguides are preferred for lowest loss. Thus, when light is focused onto the focal plane 32 wavelengths representing positive deviation and negative deviation about each channel center wavelength are inverted such that beams on the focal plane 34 are no longer in wavelength order. The propagation of all the wavelengths from the focal plane 34 through a second arrayed waveguide grating 28 will recompress all the wavelengths that were within a channel band while increasing the distance from one channel band to the next channel band. Each demultiplexed signal is focused on output focal plane 36 where they can be easily picked up by output waveguides 18. In an opposite direction, this can be used to obtain a flat top multiplexor. The use of arrayed waveguide gratings is preferred since this design provides the least loss. A further advantage in the use of phased array gratings is realized because they can be manufactured to very close tolerances to provide substantially the same dispersion.

This invention can also be used in wavelength dependent optical elements such as diffraction gratings, for example, an echellette grating, which has been known for many years to produce a high-resolution spectrum where the wavelength is a function of the diffracted angle. Thus a single grating can demultiplex many wavelengths. When an incident beam comprising a plurality of wavelengths of light is incident upon a bulk diffraction grating, the light is diffracted by the grating and is separated into sub-beams that can be focused by a lens and received by a plurality of waveguides or detectors. However, providing a grating system that has a desired spectral amplitude response, for example a "flat top" response, has been difficult. Furthermore it is a goal of any system to provide such a "flat-top" response without sacrificing the power of the optical signal.

Figure 7:
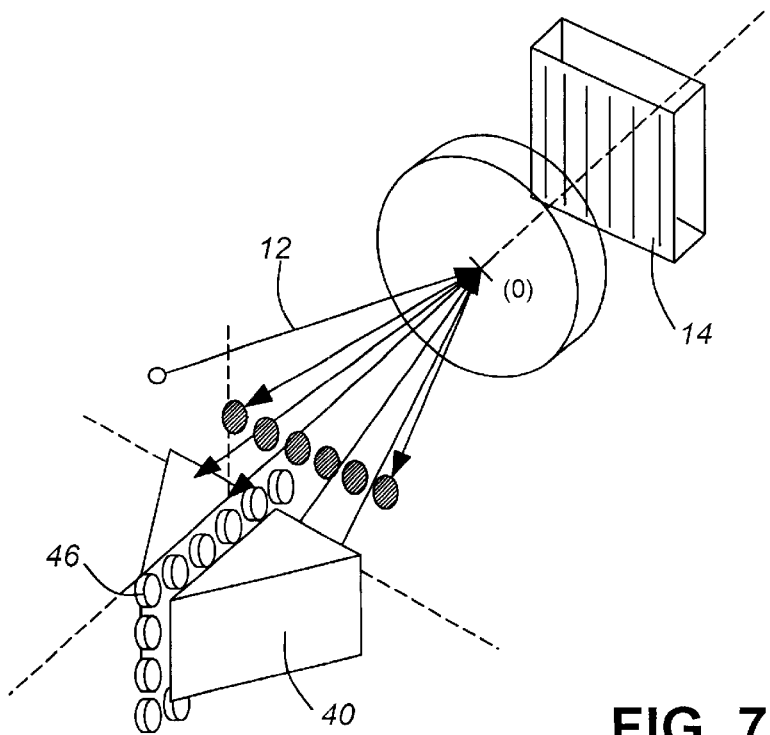
FIG. 7 is a schematic illustration of a double pass configuration showing a corner cube mirror with an array of micro-refractive optical systems at the focal plane.

FIG. 7 schematically illustrates a further embodiment in accordance with the invention. This is a double pass configuration using only one grating 14. A corner cube mirror 40 receives a dispersed input signal from the grating 14, and globally inverts the wavelength order. An array of micro-refractive optical systems 46 are arranged in the center of the comer cube mirror 40, corresponding to the focal plane. The array 46 divides the globally inverted wavelengths into channels and locally inverts wavelengths within each channel about a center wavelength. The reordered inverted wavelengths are then reflected back to the grating 14 for a second dispersion. The outputs of the second dispersion step are directed at a different angle for each channel.

Figure 8A:
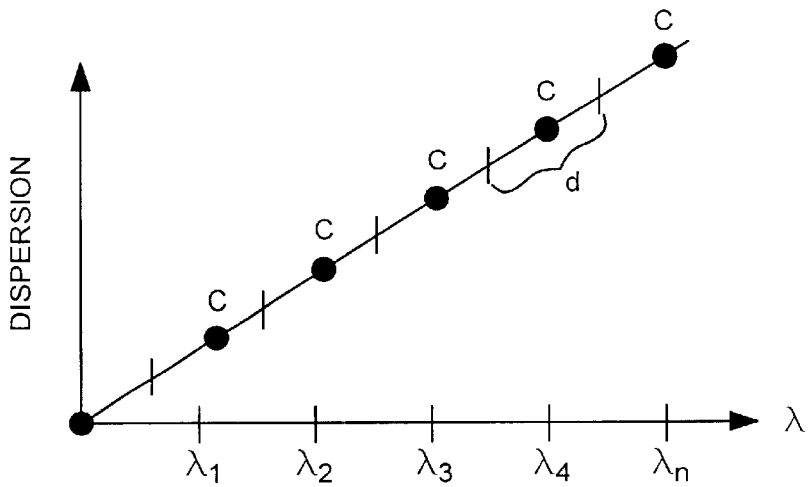
FIG. 8a is a graphical representation of a first dispersion.

FIG. 8a is a graph of dispersion versus wavelength showing a dispersion from a dispersion element. Preferably as shown, the dispersion element has a period including all channel wavelengths of interest, in this case $_1$ to $_n$. The center wavelength of each channel $_1$ to $_n$ is marked C. In addition in a continuous dispersion device, the deviation for each channel band is marked d between the center wavelengths. The dispersion on the y-axis represents the position where each channel can be picked up. However, the pick up fiber or waveguide cannot pick up 100% of a channel spread as illustrated due to limitations of the fiber diameter relative to the channel width. In addition, it can be seen that the dispersion of channel 1 is adjacent the dispersion of channel 2 without any physical separation between the channels, making channel pick up without crosstalk more difficult.

Figure 8B:
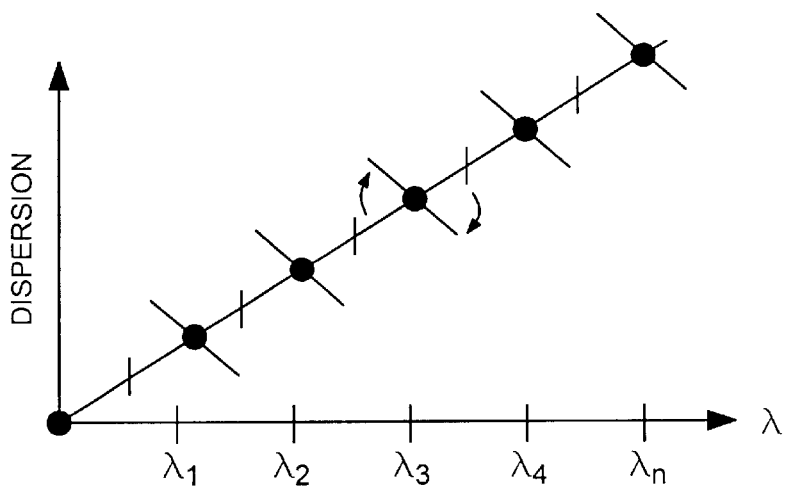
FIG. 8b is a graphical representation of the combined dispersion and locally inverted position.

FIG. 8b is a graph illustrating the dispersion and inverted position of the channel wavelengths superimposed. Looking at the dispersion of channel 3 at $_3$, the inversion is depicted as a reorientation of the dispersed channel band. The arrows show the deviation of the channel wavelength both positive and negative positionally moved before the light is dispersed again. The inversion about the center wavelength does not change the position of the center wavelength.

Figure 8C:
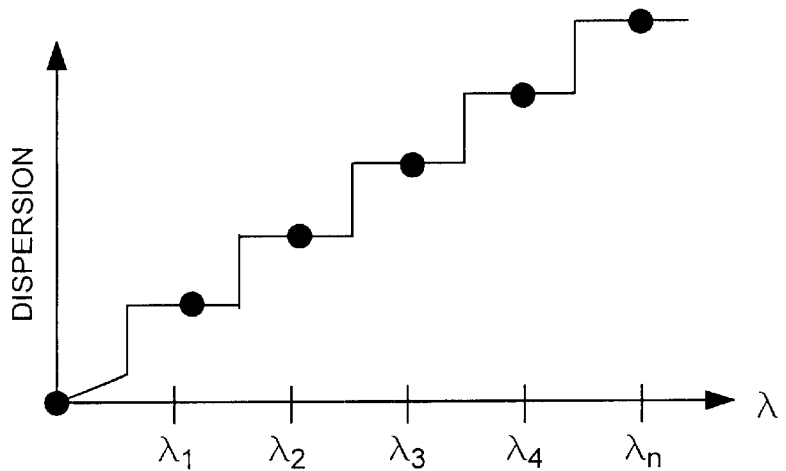
FIG. 8c is a graphical representation of the output of the cascaded dispersions.

FIG. 8c is a graph illustrating the results of the second dispersion. The inverted deviation portions of the channels have been dispersed to an average position substantially at the same position as the center wavelength of each channel. Thus substantially the complete channel band can be picked up by an optical fiber or waveguide without additional losses due to dispersion. Further, the channels are no longer positioned adjacent each other, improving channel separation.

Figure 9:
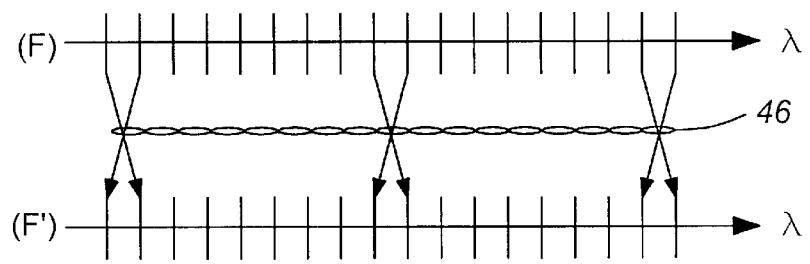
FIG. 9 is a schematic illustration of an array of micro-refractive optical systems for providing local inversion of wavelengths.

FIG. 9 shows schematically an array of micro-lenses 46 for dividing the dispersed wavelengths of light into channels and for inverting the dispersed wavelengths of light about a center wavelength within each channel band. This array 46 is an array of micro-refractive optical systems which can consist of Selfoc lenses, Fresnel lenses or conventional lenses. An array of single lenses is shown for simplicity, however a more complex system, such as of double lenses, is preferred to correct aberrations. Alternatively, it is also possible to use an array of multimode interference couplers (MMI). The input and output wavelengths must be at the focal planes F, F' of the lenses. This inversion works in transmission or reflection if ¼ pitch Selfoc lenses are used. The use of a micro-lens array is intrinsically more compact, since it is possible to double-pass on the same grating using a single doublet lens (not shown).

Figure 10:
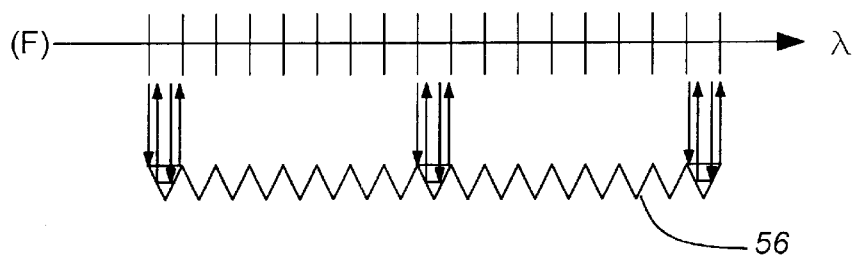
FIG. 10 is a schematic illustration of an array of V-groove micro-mirrors for providing local inversion of wavelengths; and, FIG. 11 is a schematic illustration of an optical demultiplexing/multiplexing system in accordance with the invention incorporating gratings of opposite signs and an array of V-groove micro-mirrors for performing the local inversion.

An alternative array for inverting dispersed wavelength order is shown in FIG. 10 comprising an array of V-groove micro-mirrors 56. This embodiment works in reflection only. The physical dimensions of the micro-lenses and V-groove mirrors are common to both to divide the dispersed signal in accordance with channel spacing: typically 50 microns for 100 gHz channel spacing. A V-groove array could be made more compactly by the introduction of anamorphic lenses to reduce the height and to enable the use of a single doublet lens instead of two. Two gratings would still be necessary. Alternatively, a single grating could be used with the V-groove array by using two lenses on top of each other with their optical centers offset.

Figure 11:
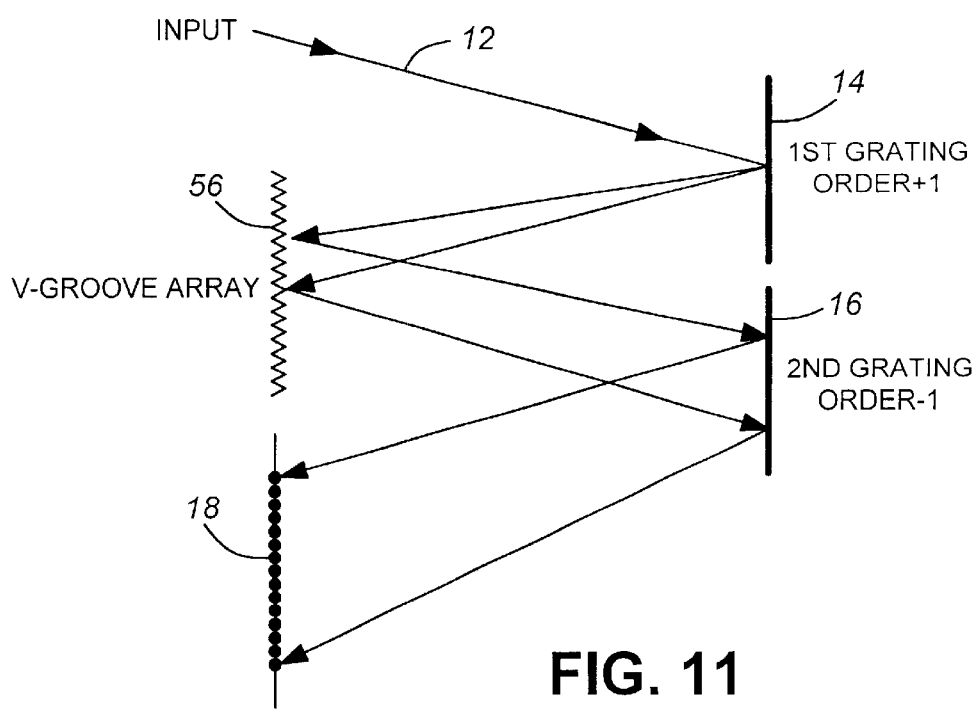

FIG. 11 depicts a system using the V-groove micromirrors 56 in demultiplexing mode. An input beam 12 is directed to a first grating 14 having an order of +1. Dispersed light is directed toward a V-groove array 56. Each V-groove dimensioned to provide channel width local inversion. The light is then redirected to a second grating 16 having an order of −1. The second grating 16 disperses the inverted light directing each channel to a separate waveguide of optical fiber output 18. An example of this system has been modelled with Zemax software.

EXAMPLE

The V-groove array is dimensioned to have a period of 54.9 microns. Two grating, each with 600 lines/mm, are provided each optimized for first or −1 order respectively. The gratings are arranged in Littrow condition. Input to each grating is provided by a doublet lens with 100 mm focal length.

The following results are predicted:

From 1549.315 to 1550.116 has an output position of 226.542+/−0.02 microns.

From 1550.116 to 1550.918 has an output position of 335.715+/−0.03 microns.

The output pitch is 109.3 microns, equal to twice the period of the V-grooves.

A substantially full amplitude "flat top" band width is 480 pm.

These results show negligible displacement of the beam spot for input wavelengths in the ITU bands. The dispersion of the wavelengths is sufficient for relatively easy pick up. And the output has a large nearly completely flat bandwidth. A further advantage is that since all wavelengths within an ITU channel are concentrated into a single point, pick up spacing is no longer a constraint on system architecture. The expected loss with the present system is 1 dB increase over standard design.

Numerous alternative embodiments will be apparent to persons of skill in the art without departing from the spirit and scope of the invention as defined in the claims attached.

What is claimed is:

1. A method of demultiplexing an optical beam into a plurality of channels, comprising a plurality of wavelengths of light, comprising the steps of:

providing the optical beam to a first dispersive means, to demultiplex the beam into spatially dispersed wavelengths of light;

dividing the spatially dispersed wavelengths of light into channels;

performing an inversion of the spatially dispersed wavelengths of light, centered about a center wavelength within each channel, to spatially invert their positions; and providing the inverted wavelengths of light to one of the first dispersive means and another dispersive means providing substantially the same dispersion as the first dispersive means for the plurality of channels, to provide the demultiplexed channels.

2. An optical device for demultiplexing an optical beam into a plurality of channels, comprising a plurality of wavelengths of light, comprising:

a first dispersive grating for receiving the beam to demultiplex the beam into spatially dispersed wavelengths of light;

means for dividing the spatially dispersed wavelengths of light into channels and for inverting the spatially dispersed wavelengths of light centered about a center wavelength within each channel; and dispersive means for receiving the inverted wavelengths of light to provide the demultiplexed channels.

3. An optical device as defined in claim 2, wherein the dispersive means comprises the first dispersive grating adapted to permit double pass dispersion.

4. An optical device as defined in claim 3, wherein the means for inverting selected wavelengths comprises a corner cube mirror for globally inverting the dispersed wavelengths having an array of micro-dispersive optical systems, for dividing the spatially dispersed wavelengths of light into channels and for locally inverting the spatially dispersed wavelengths of light centered about a center wavelength within each channel, at a central focal plane of the corner cube mirror.

5. An optical device as defined in claim 2, wherein the dispersive means comprises a second dispersive grating.

6. An optical device as defined in claim 5, wherein the second dispersive grating provides substantially the same dispersion as the first grating.

7. An optical device as defined in claim 6, wherein the first dispersive grating and the second dispersive grating are optimized for first order and −1 order respectively.

8. An optical device as defined in claim 5, wherein the means for dividing the spatially dispersed wavelengths of light into channels and for inverting wavelengths of light centered about a center wavelength within each channel comprises an array of micro-refractive optical systems and a plane mirror.

9. An optical device as defined in claim 5, wherein the means for dividing the spatially dispersed wavelengths of light into channels and for inverting wavelengths of light centered about a center wavelength within each channel comprises an array of V-groove micro-mirrors.

10. An optical device as defined in claim 5, wherein the first and second dispersive means comprise phased array gratings selected to provide global wavelength dispersion of the optical beam.

11. An optical device as defined in claim 10, wherein the means for inverting wavelengths of light is selected from the group consisting of: an array of micro-refractive optical systems, a Selfoc lens array, or a multimode interference coupler array.

12. An optical device as defined in claim 2, wherein the means for dividing the spatially dispersed wavelengths of light into channels and for inverting wavelengths of light centered about a center wavelength within each channel comprises an array of micro-refractive optical systems.

13. An optical device for demultiplexing an optical beam into a plurality of channels, comprising a plurality of wavelengths of light, comprising:

a first phased array grating for receiving the beam to demultiplex the beam into spatially dispersed wavelengths of light on a first output focal plane;

means for dividing the spatially dispersed wavelengths on the first output focal plane into channels and for inverting the spatially dispersed wavelengths centered about a center wavelength within each channel;

a second phased array grating having an input focal plane for receiving the inverted wavelengths of light, for demultiplexing the channels.

14. An optical device as defined in claim 13, wherein the means for dividing the spatially dispersed wavelengths of light and for inverting the spatially dispersed wavelengths centered about a center wavelength within each channel comprises an array of multimode interference couplers.

* * * * *

UNITED STATES PATENT AND TRADEMARK OFFICE
CERTIFICATE OF CORRECTION

PATENT NO.     : 6,381,052 B1
DATED          : April 30, 2002
INVENTOR(S)    : Delisle et al.

It is certified that error appears in the above-identified patent and that said Letters Patent is hereby corrected as shown below:

Column 4,
Line 16, "is $_{ITU} + _{dev}$," should read -- is $\lambda_{ITU} + \lambda_{dev}$, --;
Line 17, "as $_{ITU}$" should read -- as $\lambda_{ITU}$ --;
Line 17, "center $_{dev}$" should read -- center $\lambda_{dev}$ --;

Column 5,
Line 62, "case $_1$ to $_n$." should read -- case $\lambda_1$ to $\lambda_n$. --;
Line 63, "channel $_1$ to $_n$" should read -- channel $\lambda_1$ to $\lambda_n$ --;

Column 6,
Line 9, "channel 3 at $_3$," should read -- channel 3 at $\lambda_3$, --.

Signed and Sealed this

Twenty-first Day of January, 2003

JAMES E. ROGAN
*Director of the United States Patent and Trademark Office*